US011788510B2

(12) United States Patent
Fàbrega Freixes et al.

(10) Patent No.: US 11,788,510 B2
(45) Date of Patent: Oct. 17, 2023

(54) NACELLE COVER PANEL

(71) Applicant: General Electric Renovables Espana, S.L., Barcelona (ES)

(72) Inventors: Jordi Fàbrega Freixes, Barcelona (ES); Jesús Javier Lorita Rodríguez, Barcelona (ES); Ander Pérez Iguzquiza, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/903,289

(22) Filed: Sep. 6, 2022

(65) Prior Publication Data

US 2023/0073244 A1    Mar. 9, 2023

(30) Foreign Application Priority Data

Sep. 7, 2021   (EP) .................................. 21382803

(51) Int. Cl.
*F03D 13/20* (2016.01)
*F03D 80/80* (2016.01)

(52) U.S. Cl.
CPC .............. *F03D 13/20* (2016.05); *F03D 80/80* (2016.05); *F05B 2240/14* (2013.01)

(58) Field of Classification Search
CPC .......... F03D 13/10; F03D 13/20; F03D 80/00; F03D 80/80; F03D 80/88; F03D 80/50; F05B 2240/14
See application file for complete search history.

(56) References Cited

U.S. PATENT DOCUMENTS

| 8,814,530 | B2* | 8/2014 | Kamibayashi | .......... F03D 80/00 |
| | | | | 416/244 R |
| 11,371,485 | B2* | 6/2022 | Taubenrauch | ............ E01F 3/00 |
| 11,585,054 | B2* | 2/2023 | Avner | ................... B60P 1/5423 |
| 2010/0239416 | A1 | 9/2010 | Morgensen et al. | |
| 2011/0076140 | A1* | 3/2011 | Elsenheimer | .......... F03D 13/10 |
| | | | | 415/200 |
| 2012/0152651 | A1 | 6/2012 | Jensen et al. | |
| 2015/0152881 | A1* | 6/2015 | Tirumalai | ............... F03D 80/80 |
| | | | | 415/182.1 |
| 2019/0226460 | A1 | 7/2019 | Madsen et al. | |
| 2020/0002908 | A1 | 1/2020 | Avner et al. | |
| 2020/0011302 | A1* | 1/2020 | Taubenrauch | ............ E01F 3/00 |
| 2020/0018292 | A1* | 1/2020 | Taubenrauch | .......... F03D 80/00 |

OTHER PUBLICATIONS

European Search Report Corresponding to EP21382803 dated Feb. 28, 2022.

* cited by examiner

*Primary Examiner* — Brian P Wolcott
(74) *Attorney, Agent, or Firm* — Dority & Manning, P.A.

(57) ABSTRACT

The present disclosure is related to nacelle cover panels and nacelle cover assemblies. The nacelle cover panel is configured to be mounted in a nacelle of a wind turbine. Further, the nacelle cover panel comprises a composite panel including at least an outer roof surface and an inner surface, and a structural frame coupled to the composite panel. Methods of providing a nacelle assembly are also disclosed.

10 Claims, 7 Drawing Sheets

NACELLE COVER PANEL

FIELD

The present disclosure relates to wind turbine nacelles. More particularly, the present disclosure relates to nacelle cover panels, interface plates configured to couple a composite panel to a structural frame, and to nacelle cover assemblies comprising the same. The present disclosure is further related to methods for providing a nacelle assembly for a wind turbine.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through the use of a gearbox. This way, the generator produces electricity which can be supplied to the electrical grid.

Wind turbines have evolved rapidly over the last decades and wind turbine components have been modified to withstand higher loads and adverse weather conditions. Wind turbine nacelles house the drive train and other tower-top components and protect them against external hazards like precipitation, dust, UV radiation and lightning strikes. Further, wind turbine nacelles generally provide an inlet and outlet for airflow within the generator; and withstand wind forces experienced by the blades, heat produced by the drive train and provide a working platform for qualified personnel.

The nacelle generally sits on top of a yaw bearing that allows it to rotate to maintain the nacelle and rotor aligned with the wind direction. Due to the relatively large volume defined by the nacelle and the interest in maximizing internal free volume, the nacelle cover, at least at several locations, may be far from structural components of the nacelle and therefore it should be able to withstand by itself severe loads during wind turbine operation. Said loads include, for example, the load of the cooling system and the handrails, the loads involved in a potential evacuation or rescue protocol at several established support points, the weight of one or more flexi-cranes or the pedestrian area, among others.

A nacelle cover may comprise one single piece or a plurality of pieces which are assembled to provide cover to the nacelle. The nacelle and nacelle cover may be assembled at an assembly plant or may be assembled in the field. Further, in some cases, the nacelle cover may be assembled uptower, which means that the nacelle cover (either one piece or a plurality of them) may be transported by a crane at least from the wind turbine base to the wind turbine nacelle. Thus, during these transport operations, the nacelle cover should also be able to withstand its own weight when hanging from dedicated lifting points.

Nacelle covers generally comprise composite materials and are often manufactured with resin-infused glass fiber composites to meet the requirements with respect to size, internal and external geometry, and weight. Although composite materials such as glass fiber-epoxy, or other combinations, can reduce the overall weight of the nacelle cover, they may not have the structural integrity to withstand the aforementioned loads acting on them. For this reason, the nacelle cover may be mechanically coupled in several locations to a wind turbine nacelle frame, which, in turn, provides the structural rigidity.

Coupling a nacelle cover to a nacelle frame generally involves a very time consuming and tedious process of component alignment. Furthermore, the nacelle cover generally needs to transfer loads from external nacelle components to the nacelle frame, which may lead to have a perforated nacelle cover. A sealed nacelle assembly is of paramount importance in offshore installations, wherein the marine environment can quickly corrode wind turbine components inside the nacelle, leading to more frequent maintenance and/or the necessity to replace components. Thus, during nacelle assembly the operators may be required to seal all perforations to later verify that there is no leakage inside the nacelle. This results in a complex and cumbersome task, wherein the elevated number of sealing points aggravates the problem.

The present disclosure provides methods and systems to at least partially overcome some of the aforementioned drawbacks.

SUMMARY

In an aspect of the present disclosure, a nacelle cover panel for a wind turbine is provided. The nacelle cover panel is configured to be mounted in a nacelle of a wind turbine and comprises a composite panel and a structural frame. The composite panel includes at least an outer roof surface and an inner surface, and the structural frame is coupled to the composite panel at the inner surface.

According to this aspect, the fact that the nacelle cover assembly comprises a structural frame, which will not suffer deformations during curing, may provide a more precise location of the connection points to the nacelle frame where it may be mounted. Thus, the assembly of the nacelle cover with the remaining structure of the wind turbine nacelle can be simplified and be less time consuming. Since the structural frame is coupled to the composite panel and delivered as a ready-made unit, nacelle assembly time can be reduced, providing a secure and reliable connection.

In a further aspect of the present disclosure, an interface plate configured to couple a composite panel to a structural frame is provided. The interface plate couples the composite panel to the structural frame at a composite panel opening. Additionally, the interface plate comprises a plurality of holes to receive fasteners and a flange configured to contact a substantially flat surface of the composite panel and to at least partially seal the opening.

According to this aspect, the interface plate provides a robust structural coupling from the exterior of the nacelle to the nacelle structural frame. Thus, any nacelle external component located on top of the nacelle may be connected to the interface plates. This connection may relieve the composite panel from the main loads that would otherwise act on it. Further, the interface plates promote a fast and reliable coupling between the composite panel and the structural frame and also mitigate the risk of leaks inside the nacelle.

In an additional aspect, a method for providing a nacelle assembly is provided. The method comprises providing a nacelle base component, and providing a nacelle cover panel comprising a composite panel including at least an outer roof surface and an inner surface, and a structural frame coupled to the composite panel. Besides, the method also comprises fastening the nacelle base component to the nacelle cover panel through the structural frame coupled to the composite panel.

According to this additional aspect, a nacelle assembly is assembled wherein the assembly of the same does not rely on composite components but on a structural frame in which geometric tolerances may be considerably reduced. The assembly with the remainder of the nacelle may be simplified, and take less time in the assembly line.

Thus, fastening the nacelle cover panel(s) to the nacelle base component may result in a more reliable process. Consequently, the use of cranes, or any other lifting means, may be more efficient than in previous methods and the assembly process may thus be faster and cheaper. Further, the fact that the nacelle assembly comprises a nacelle cover assembly where individual nacelle cover panels may be dismounted for maintenance, replacement or to upgrade them results in a more versatile nacelle assembly. Thus, a further advantage according to this aspect is the simplicity in the temporal or permanent nacelle cover panel replacement due to strategic or operational reasons.

Throughout this disclosure, the terms "roof surface" and "outer roof surface" are used indistinctively and refer to the exterior surface relative to a nacelle.

Additional objects, advantages and features of embodiments of the present disclosure will become apparent to those skilled in the art upon examination of the description, or may be learned by practice.

DETAILED DESCRIPTION OF EXAMPLES

Reference now will be made in detail to embodiments of the disclosure, one or more examples of which are illustrated in the drawings. Each example is provided by way of explanation, not as a limitation. In fact, it will be apparent to those skilled in the art that various modifications and variations can be made in the present disclosure without departing from the scope or spirit of the teaching. For instance, features illustrated or described as part of one embodiment can be used with another embodiment to yield a still further embodiment. Thus, it is intended that the present disclosure covers such modifications and variations as come within the scope of the appended claims and their equivalents.

Figure 1:
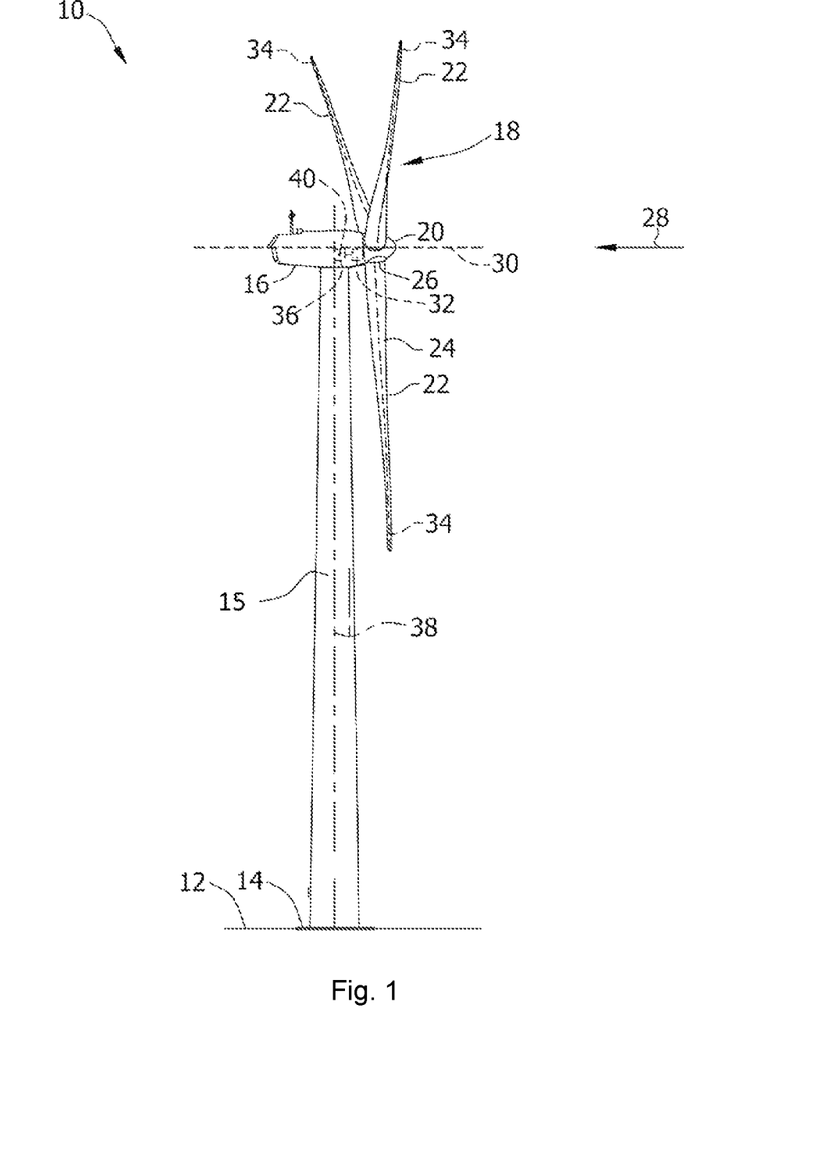
FIG. 1 schematically illustrates a perspective view of one example of a wind turbine.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
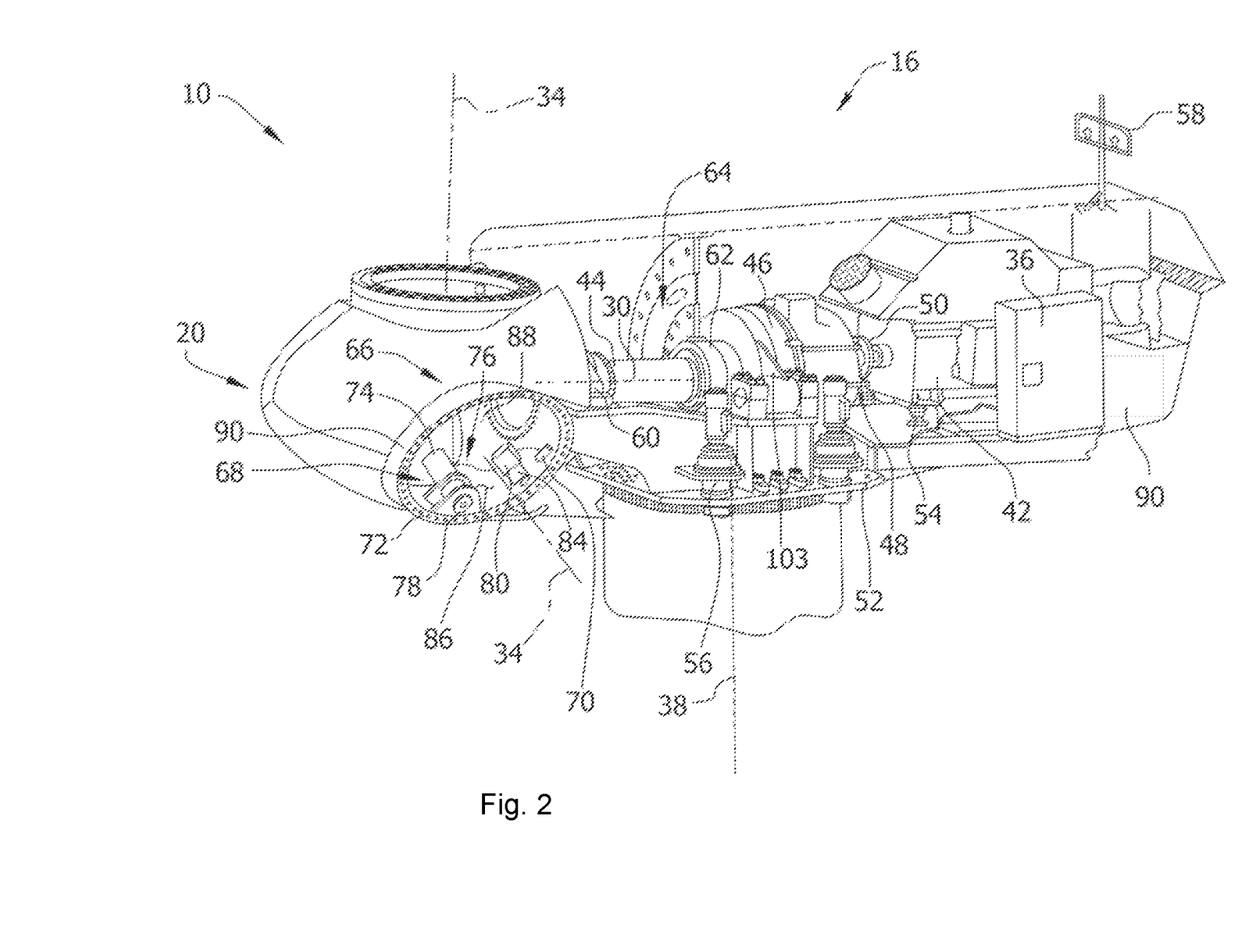
FIG. 2 illustrates an example of a hub and a nacelle of a wind turbine.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 may also include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system 58 which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10.

The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer roof surface of hub 20 and may be coupled, directly or indirectly, to the outer roof surface.

Figure 3:
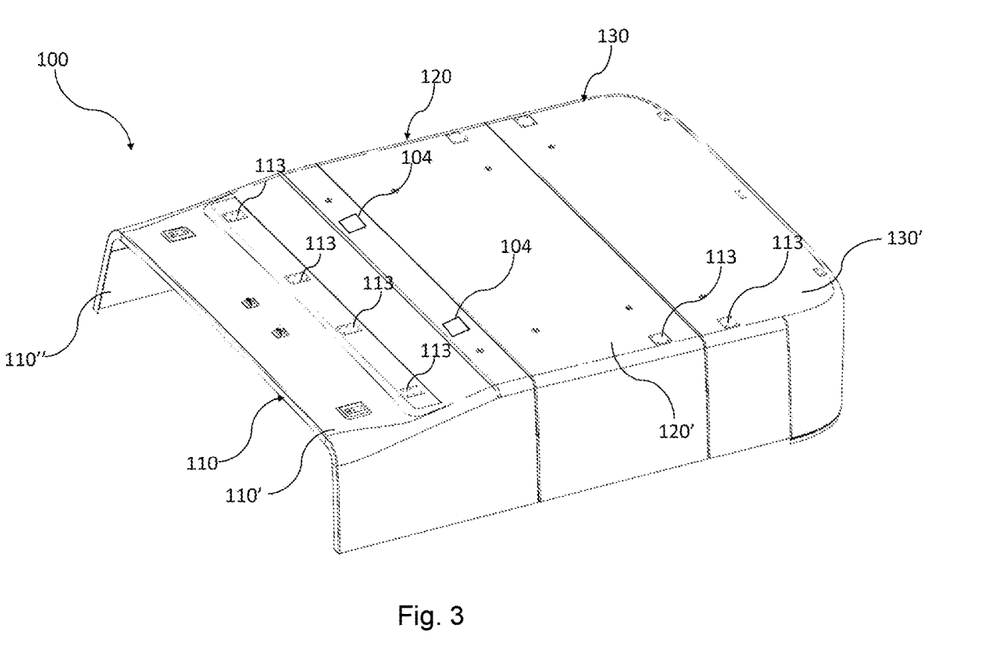
FIG. 3 schematically illustrates a perspective view of one example of a nacelle cover assembly comprising several nacelle cover panels.

FIG. 3 is a schematic perspective view of a nacelle cover assembly 100 for a wind turbine. FIG. 3 shows a nacelle cover assembly 100 comprising three nacelle cover panels 110, 120, 130 configured to be mounted in a nacelle of a wind turbine and including at least an outer roof surface 110' and an inner surface 110", and a structural frame (depicted in FIG. 4B with the reference numeral 112) coupled to the composite panels 110, 120, 130 at the inner surface.

As can be seen in the example of FIG. 3, the nacelle cover assembly 100 may be formed by one or more nacelle cover panels 110, 120, 130 with one or more structural frames in each of the one or more nacelle cover panels 110, 120, 130, so that the nacelle cover assembly 100 together covers substantially the whole upper surface of the nacelle. It is noted that the structural frames in this example are coupled to the inner side 110" of the nacelle cover panels 110, 120, 130 and therefore are not visible in FIG. 3.

The fact that the nacelle cover assembly 100 may be formed by a plurality of nacelle cover panels 110, 120, 130 may result in a modular configuration, wherein certain sections of the nacelle cover assembly 100 may be removed for maintenance and/or may be replaced for new covers or for upgraded covers. Alternatively, the nacelle cover assembly 100 may be formed by a single composite panel spanning across all or a section of the nacelle upper surface.

As previously discussed, and to meet size, internal and external geometry, and weight requirements, the nacelle cover panels 110, 120, 130 may include glass fiber, and/or polyester resin. The nacelle cover panels 110, 120, 130, may additionally or alternatively include other fiber and resins such as carbon, basalt or aramid fiber, as well as epoxy or vinylesther resin among others.

Additionally, FIG. 3 shows that the nacelle cover panels 110, 120, 130 may further comprise one or more interface plates 113. Also, in this example, the nacelle cover panels 110, 120, 130 comprise a composite panel with one or more openings 104 in the outer roof surface 110', 120', 130'. The one or more openings 104 are configured to receive the one or more interface plates 113, which are configured to be mechanically connected to the structural frame.

In this example not all interface plates 113 are illustrated. The number and arrangement of openings 104 and interface plates 113 may differ in different nacelle cover panels 110, 120, 130 of wind turbines due to structural rigidity requirements and/or external nacelle components on them. The structure and function of the interface plates 113 will be discussed later, particularly with reference to FIG. 6. It is noted that all features of the composite panels and of the interface plates 113 can be included in a nacelle cover panel 110, 120, 130 or in a nacelle cover assembly 100 comprising the same, and vice versa.

Figure 4A:
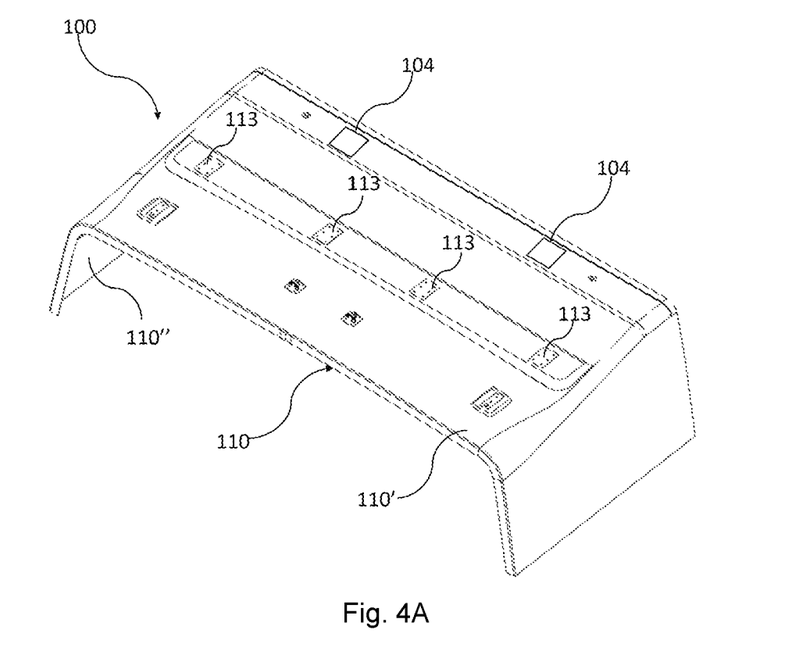
FIG. 4A schematically illustrates a perspective top view of an example of a nacelle cover assembly comprising a single nacelle cover panel.
Figure 4B:
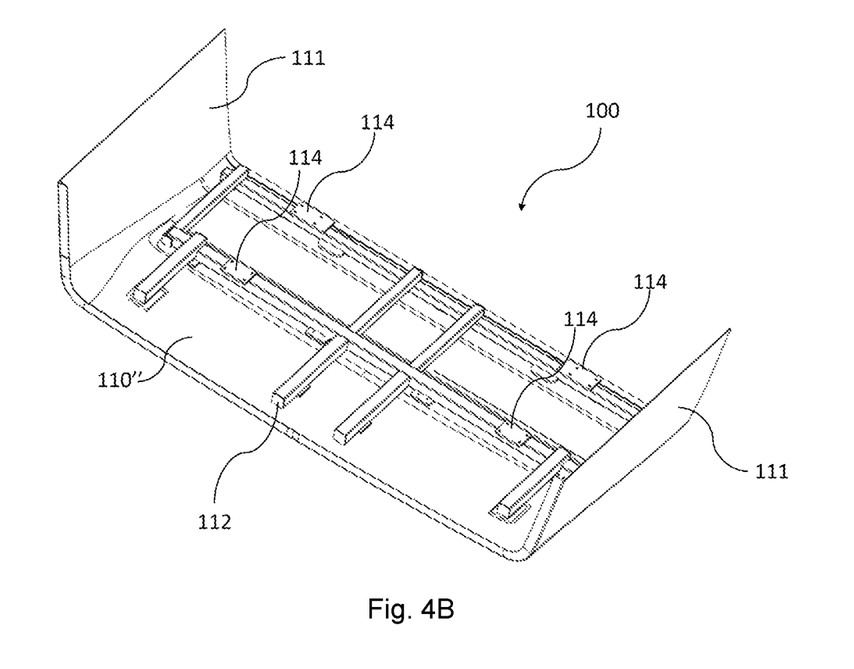
FIG. 4B schematically illustrates a perspective bottom view of the nacelle cover assembly shown in FIG. 4A.

FIGS. 4A and 4B are a schematic perspective top and bottom view of an example of a nacelle cover assembly 100, respectively. In this example, the nacelle cover assembly 100 comprises a single nacelle cover panel 110 with a structural frame 112 coupled to the composite panel at least partially protruding from the composite panel inner surface 110". The structural frame 112 comprises support zones 114 to couple the structural frame 112 to an existing frame 115 (depicted in FIG. 5) located within a wind turbine nacelle 16.

Further, FIG. 4B shows the arrangement of the structural frame 112, which forms a nearly cartesian grid of structural beams in this example. However, other arrangement of the elements forming the structural frame 112 may be also possible, as for example with non-straight angles between beam sections or with strengthening ribs instead of beams. The structural frame 112 provides strength and stiffness to the nacelle cover. Therefore, the structural frame 112 may be made of a material with greater strength and stiffness than the composite panel material. Strength may herein be regarded as ultimate tensile strength, and stiffness may be expressed as having a higher modulus of elasticity.

The structural frame 112 may be made of carbon steel. The percentage of carbon in the steel composition can vary depending on the specific requirements of the assembly to minimize production costs while maintaining high performance standards. Further, other metal alloys, and particularly other steel alloys can also be used both for specific components of the structural frame and for the main beams of the same. Alternatively, the structural frame 112 may be made of fibre profiles, and more precisely of pultruded fibre profiles, and also of a combination of metal and fibre profiles.

Furthermore, the nacelle cover assembly 100 of the example of FIGS. 4A and 4B shows that the nacelle cover panel 110 can also include one or more lateral surfaces 111 extending substantially perpendicular to a thickness of the cover panel i.e. in a length and/or a width direction of the nacelle. These lateral surfaces 111 allow closing the interior volume of the nacelle laterally. To do so, the lateral surfaces 111 may comprise receptacles and/or fasteners to couple to a wind turbine nacelle casing (in particular sidewalls thereof), nacelle base or other elements of the nacelle 16 to at least partially isolate the interior of the nacelle 16 from atmospheric external hazards.

Figure 5:
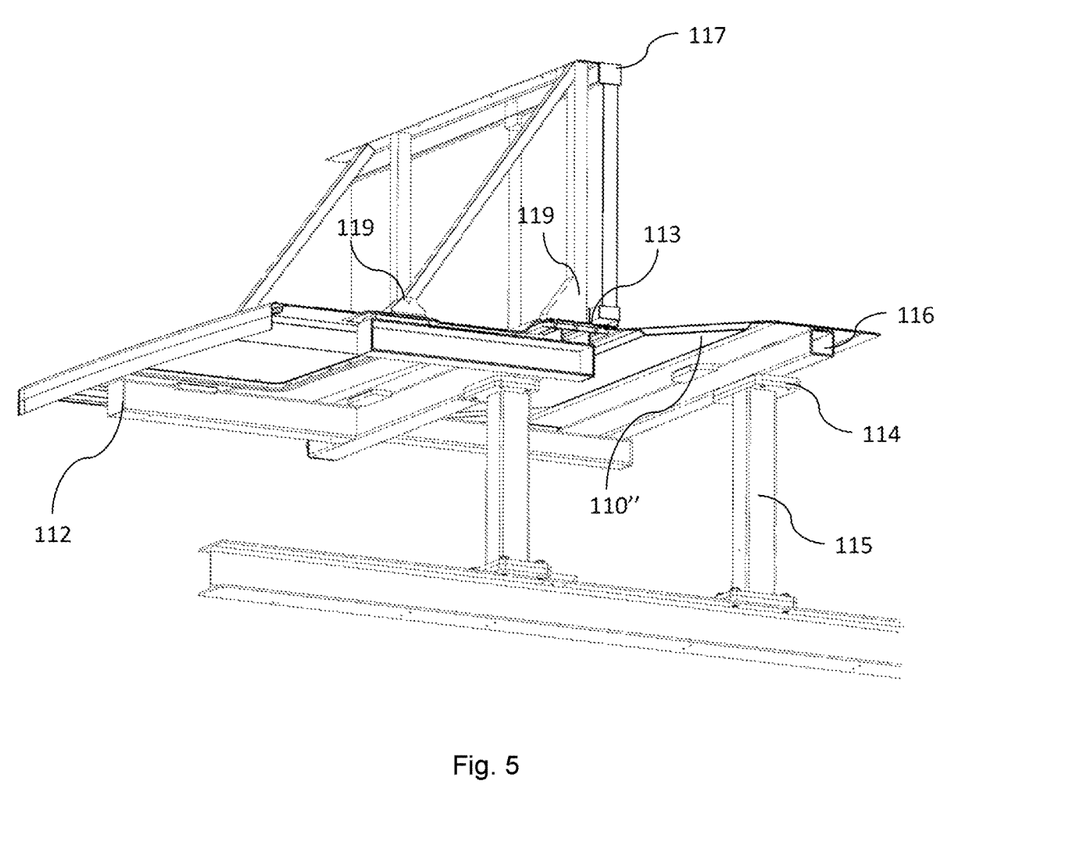
FIG. 5 schematically illustrates a perspective bottom view, including a longitudinal cross-section, of another example of a nacelle cover assembly over a nacelle base existing frame.
Figure 6:
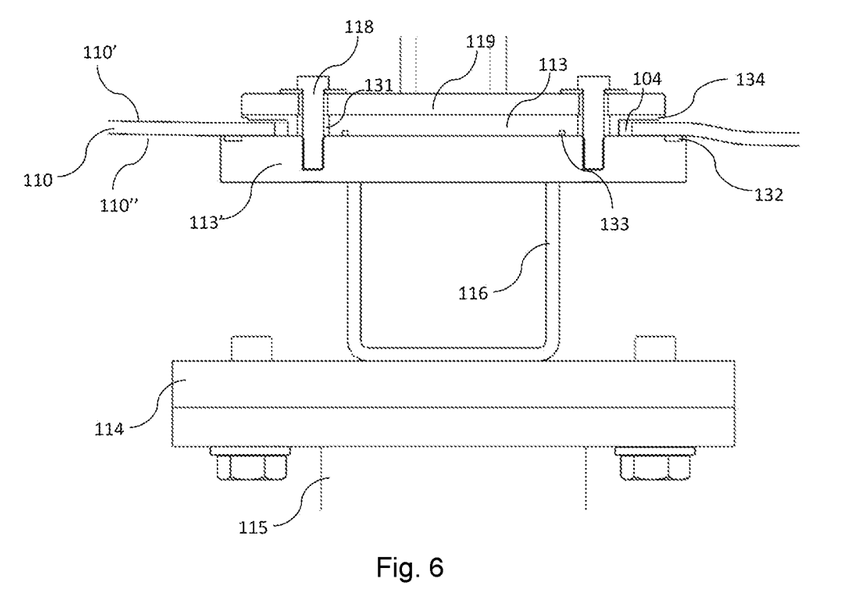
FIG. 6 schematically illustrates a detailed cross-sectional view of an interface place coupled to a nacelle cover panel and to an external nacelle component.

FIG. 5 is a schematic perspective bottom view of a nacelle cover assembly 100. As shown in the figure, the nacelle cover assembly 100 may be mounted on an existing frame 115 of the nacelle 16. In these figures, a longitudinal cross-section view shows certain elements in more detail. More particularly, it shows that the structural frame 112 comprises beams 116 with a rectangular hollow section. Further, the longitudinal cross-section provides a more detailed view of the interface plate 113 and its coupling with a cooling system 117 from its top side and with the structural frame 112 from its bottom side.

The interface plate 113, which will be described in more detail with reference to FIG. 6, represents a connection element between the structural frame 112 and the external nacelle components, such as a cooling system 117, located on the outer roof surface 110'. Thus, the cooling system 117, and any other element mounted on top of the nacelle cover assembly 100, i.e. handrails, lifting points, cranes, or others, may be coupled to the structural frame 112 through the interface plates 113. Doing so, the loads acting on the interface plates 113 will be transferred to the structural frame 112 and will not overload the composite panel. To this end, the one or more interface plate 113 may include one or more through holes and fasteners, and the structural frame may include receptacles to mechanically attach the interface plate 113 to the structural frame 112 using the fasteners, as will be explained in relation to FIG. 6.

In the example illustrated in FIG. 5, the cooling system 117 comprises a connector 119 for fastening the cooling system 117 to the interface plate 113. The same principle can also be applied to any other external component that may be connected to the nacelle cover assembly 100, or to a nacelle cover panel 110, through interface plates 113.

Further, FIG. 5 shows the attachment between the structural frame 112 and an existing frame 115 within the nacelle 16 through support zones 114. The support zones 114 may be formed e.g. by a mounting bracket or, in the illustrated example, as a substantially flat plate. Any attachment or fitting which facilitates joining the structural frame 112 of the cover assembly to the internal frame 115 of the nacelle may be used.

FIG. 6 schematically shows a detailed cross-sectional view of an interface place 113 configured to couple a nacelle cover assembly 100, or composite nacelle panel 110, to a structural frame 112. In this example, the interface plate is located within the composite panel opening 104 and comprises holes 131 to receive fasteners 118, and the structural frame 112 includes hollow rectangular beams 116 and connection plates 113' to receive the fasteners 118 and mechanically attach the interface plate 113 to the structural frame 112. The interface plate comprises holes 131 that may extend through the interface plate and may be configured to receive fasteners 118. Further, the holes 131 of the interface plate 113 may also be coincident with holes (e.g. blind holes) in the connection plate 113'. The holes 131 of the interface plate 113 may be configured to receive fasteners 118 to couple the interface plate 113 and any external nacelle component located on top of the outer roof surface 110' (i.e. a handrail, cooling system or other) with the structural frame 112.

The holes 131 of the interface plate 113 or the holes of the connection plate 113' may have an inner thread matching the respective thread of the fasteners. In the present example, the inner threads are in the holes of the connection plate 113'. In other examples, the interface plate 113 may comprise a set of holes dedicated for the connection to the structural frame 112 and another set of holes for the connection to any external nacelle components.

Furthermore, FIG. 6 shows that the interface plate 113 may comprise a flange 134 configured to contact a substantially flat surface of the nacelle cover assembly 100 or nacelle cover panel 110. Thus, the flange 134 is arranged to sit at least partially on the outer roof surface 110' of the composite panel and the flange 134 of the interface plate may thus overlap the composite roof panel. The flange 134 provides a contact area that can reduce the penetration of debris and/or water from the exterior into the nacelle 16.

Further, in other examples, the interface plate 113 may include a gasket arranged to sit at least partially on the composite panel roof surface 110' and to at least partially seal the composite nacelle panel opening 104. To provide an additional sealing barrier, in further examples the interface plate 113 may comprise an adhesive element to attach the one or more interface plate 113 mechanically or chemically to the nacelle cover panel 110 or nacelle cover assembly 100.

Further, the holes 131 may be totally or partially surrounded by recesses 133 configured to receive a sealing material and or a gasket to at least partially seal the connection between the interface plate 113 and the connection plate 113'. In the example shown in FIG. 6, the connection plate 113' of the structural frame 112 further comprises recesses 132 configured to receive a structural adhesive to connect the connection plate 113' with the inner surface 110" of the composite panel.

As discussed, the interface plate 113 may provide a load transfer from nacelle external components to the existing frame 115. Thus, the interface plate 113 may be made of a material with sufficient strength and stiffness to effectively transmit the loads to the internal existing frame 115. Additionally, as the interface plate 113 may be exposed to weather and atmospheric conditions, and e.g. marine environments, the interface plate 113 may be made of a non-corrosive material.

In a further example, the interface plate 113 may be made of stainless steel. More particularly, it may be made of marine grade stainless steel. An interface plate 113 made from such materials, typically containing molybdenum, can resist the corrosive effects of salt in seawater and can result in a longer lifespan for the component with reduced maintenance.

In FIG. 6, the structural frame has been illustrated to include a hollow rectangular beam 116 and a connection plate 113'. However, beams with other geometries or even a structural frame comprising other elements than hollow beams can also be used.

The interface plates 113 can transfer the external loads directly to the structural frame and to an existing nacelle frame 115 (inside the wind turbine nacelle 16) through the support zones 114 and may provide enhanced water tightness due to its configuration. Further, the fact that the interface plates 113 can be installed in the assembly line can considerably reduce the number of connection points of the nacelle cover assembly 100 or nacelle cover panel 110 that may be checked on site or at the end of the assembly process, reducing the final assembly time.

Figure 7:
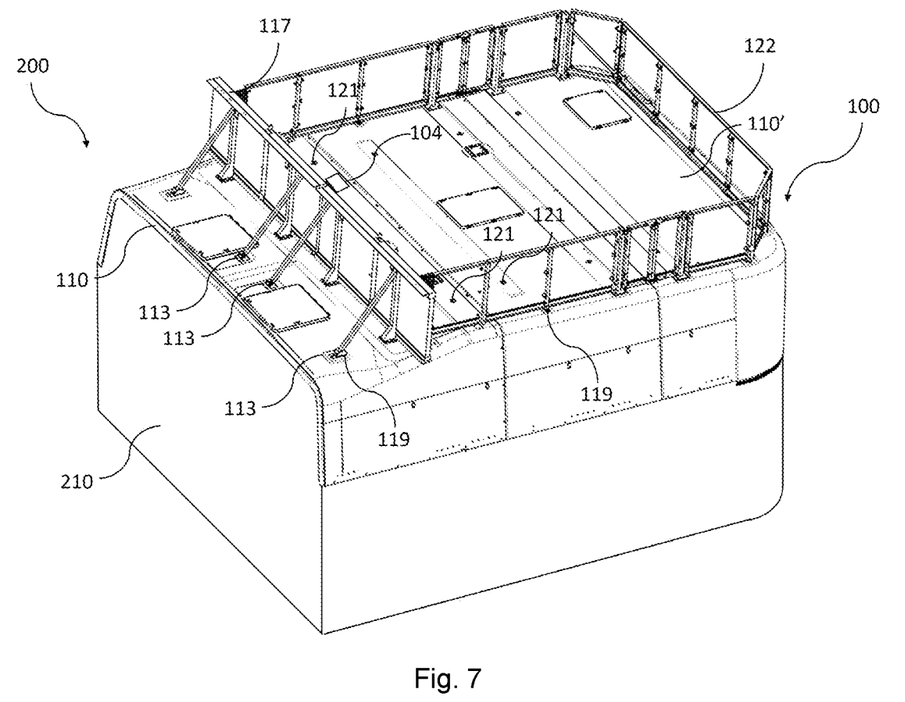
FIG. 7 schematically illustrates a perspective view of one example of a nacelle assembly.

FIG. 7 is a perspective view of an example of a nacelle assembly 200. In this example, the nacelle assembly 200 comprises a nacelle base component 210 shown schematically, and a nacelle cover assembly 100, where the nacelle cover assembly 100 comprises a nacelle cover panel 110 comprising a composite panel and including at least an outer roof surface 110' and an inner surface. The nacelle cover panel 110 includes a structural frame 112 coupled to the composite panel, and one or more interface plates 113. Further, the outer roof surface 110' of the composite panel comprises one or more openings 104 to receive the one or more interface plates 113 coupling with the structural frame. Note that the structural frame is located in the inner surface of the composite panel and therefore is hidden underneath the outer roof surface 110'.

In this example, a handrail 122 has been installed on top of the nacelle cover assembly 100 with the connectors 119 connected to the structural frame through the interface plates 113. The example also shows that the nacelle cover assembly 100 includes a cooling system 117 connected to the structural frame 112 through the interface plates 113 and lifting points 121. One or more of the lifting points 121 may comprise an interface plate 113 so that the nacelle cover assembly 100 or nacelle cover panel 110 can be lifted from a point mechanically connected to the structural frame. Other type of external components may be additionally or alternatively installed in the nacelle assembly 200.

Figure 8:
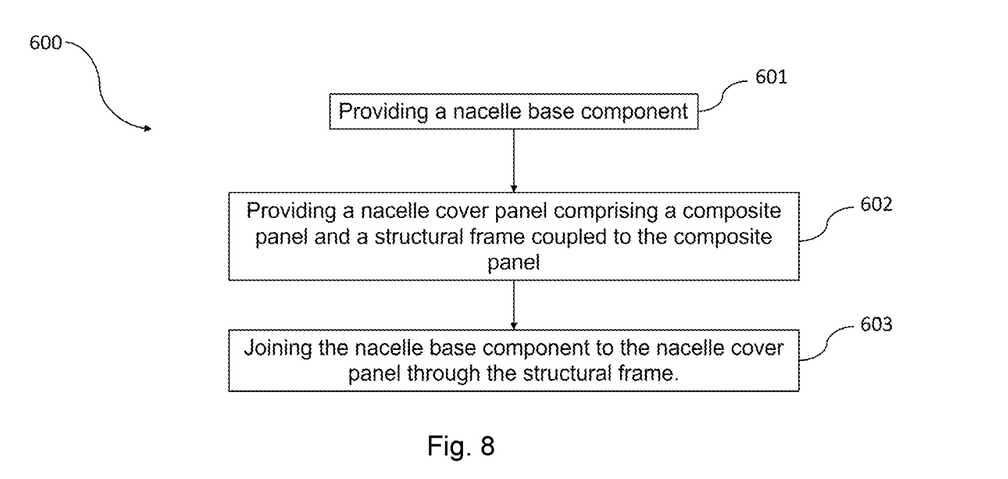
FIG. 8 shows a flowchart of an example of a method for providing a nacelle assembly.

In another aspect of the disclosure, a method 600 is provided. Method 600 is suitable for providing a nacelle assembly 200. Method 600 is schematically illustrated in FIG. 8.

The method comprises, at block 601, providing a nacelle base component 210. The nacelle base component 210 may have a variety of morphologies, as for example an existing frame 115 or a more complex structure with a shell or panel to at least partially isolate the interior of the nacelle from the external atmospheric hazards. The nacelle base component may typically include a structural frame and a part of the housing (enclosure) of the nacelle. Consequently, the base component 210 may also comprise a panel acting as a base, at least a panel acting as a lateral wall and an existing internal frame 115 of a nacelle.

The method 600 also comprises, at block 602, providing a nacelle cover panel 110 comprising a composite panel including at least an outer roof surface 110' and an inner surface 110", and a structural frame 112 coupled to the composite panel at the inner surface 110". The fact that the structural frame 112 is directly coupled to the composite panel allows the nacelle cover panel 110 to be directly mounted to a nacelle 16 without the need of interconnection parts.

The method 600, at block 603, comprises joining the nacelle base component 210 to the nacelle cover panel 110 through the structural frame 112 coupled to the composite panel. This joining step allows to reduce time during installation and commissioning due to the relative simplicity of the same; the structural frame 112 may not be subjected to geometric modifications during the assembly line and therefore, the joints between components would remain coincident.

In examples, the method 600 for providing a nacelle assembly 200 may comprise providing one or more additional nacelle cover panels 120, 130 and fastening the additional nacelle cover panels 120, 130 provided to the nacelle base component 210 to cover substantially all a nacelle upper surface.

Further, in other examples, the nacelle cover panel(s) 110, 120, 130 provided may comprise one or more openings 104 to receive one or more interface plates 113. Besides, the method 600 may further comprise providing one or more interface plates 113, and locating the one or more interface plates 113 in the one or more openings 104 and coupling the interface plates 113 with the structural frame 112. As discussed, the connection between the interface plates 113 and the structural frame 112 significantly reduces the external loads acting on the composite panel when the nacelle external components (i.e. cooling system, handrails, evacuation ports, flexi-cranes or others) are directly connected to the interface plates 113. Further, it also reduces the number of points to validate on site for water tightness, shortening the installation time and reducing maintenance and commissioning time.

In this aspect, the method 600 may additionally comprise sealing the openings 104 where the interface plates 103 are located. The sealing can include sealing a periphery of the openings 104 and also any connection point or holes 131 configured to receive fasteners for joining the interface plate 113 to the structural frame 112.

In this aspect, the method 600 may additionally further comprise providing adhesive to at least a contact surface between the composite panel and the interface plate 113. The composite panel and the interface plate may be attached to each other by gluing.

The interface plate 113 provided in the method 600 may further comprise elongated flanges 134 to increase the contact surface between the composite panel and the interface plate 113, reducing even further the risk of water leakage. Other alternatives such as providing interface plates 113 with gaskets are also possible to mitigate the risk of water leakage.

This written description uses examples to disclose the teaching, including the preferred embodiments, and also to enable any person skilled in the art to practice the teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A nacelle cover panel configured to be mounted in a nacelle of a wind turbine, the nacelle cover panel comprising:
   a composite panel comprising an outer roof surface and an inner surface;
   a structural frame coupled to the composite panel at the inner surface; and
   wherein the outer roof surface comprises one or more openings, and further comprising interface plates at least partially located in the openings and mechanically connected to the structural frame.

2. The nacelle cover panel according to claim 1, wherein the interface plates comprise one or more through holes and fasteners, wherein the structural frame comprises receptacles that receive the fasteners and mechanically attach the interface plate to the structural frame.

3. The nacelle cover panel according to claim 1, wherein the interface plates comprise a flange supported at least partially on the outer roof surface.

4. The nacelle cover panel according to claim 3, wherein the interface plates comprise a gasket supported at least partially on the outer panel roof surface.

5. The nacelle cover panel according to claim 1, wherein the interface plates are glued to the composite panel.

6. The nacelle cover panel according to claim 1, wherein the interface plates are made of stainless steel.

7. The nacelle cover panel according to claim 1, wherein the structural frame comprises support zones to couple the structural frame to an existing frame located within the wind turbine nacelle.

8. The nacelle cover panel according to claim 1, wherein the structural frame comprises carbon steel beams.

9. The nacelle cover panel according to claim 1, wherein the composite panel comprises glass fibres and polyester resin.

10. A nacelle cover assembly for a wind turbine nacelle, comprising a plurality of the nacelle cover panels according to claim 1, wherein the nacelle cover assembly is configured to cover substantially an entire upper surface of the wind turbine nacelle.

* * * * *